United States Patent
Rose et al.

(10) Patent No.: US 9,533,549 B2
(45) Date of Patent: Jan. 3, 2017

(54) SYSTEM AND METHOD FOR CONTROLLING HEATING MODES FOR HYBRID ELECTRIC VEHICLE (HEV)

(71) Applicant: GM GLOBAL TECHNOLOGY OPERATIONS LLC, Detroit, MI (US)

(72) Inventors: Kathy D. Rose, Novi, MI (US); Richard A. Marsh, Beverly Hills, MI (US); Andrew J. Farah, Troy, MI (US); Daniel P. Grenn, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 327 days.

(21) Appl. No.: 14/245,572

(22) Filed: Apr. 4, 2014

(65) Prior Publication Data

US 2015/0283878 A1    Oct. 8, 2015

(51) Int. Cl.
*B60H 1/00* (2006.01)
*B60H 1/03* (2006.01)

(52) U.S. Cl.
CPC .......... *B60H 1/00735* (2013.01); *B60H 1/004* (2013.01); *B60H 1/00764* (2013.01); *B60H 1/00878* (2013.01); *B60H 1/00964* (2013.01); *B60H 1/03* (2013.01)

(58) Field of Classification Search
CPC ... G01K 1/026; Y10S 903/00; B60H 1/00735; B60H 1/004; B60H 1/00764; B60H 3/00; B60H 1/00878; B60H 1/00964; B60H 1/03; F02D 41/00
See application file for complete search history.

(56) References Cited

U.S. PATENT DOCUMENTS

| | | | | |
|---|---|---|---|---|
| 5,720,181 A * | 2/1998 | Karl | ................... | B60H 1/00735 165/248 |
| 5,775,415 A * | 7/1998 | Yoshimi | ............. | B60H 1/00821 165/202 |
| 6,052,998 A * | 4/2000 | Dage | ................... | B60H 1/00735 62/178 |
| 8,052,066 B2 * | 11/2011 | Watanabe | .............. | B60H 1/004 123/41.1 |
| 8,859,938 B2 * | 10/2014 | Eisenhour | .......... | B60H 1/00742 219/202 |

(Continued)

FOREIGN PATENT DOCUMENTS

CN          201309391 Y       9/2009

*Primary Examiner* — Thomas G Black
*Assistant Examiner* — Ana Thomas
(74) *Attorney, Agent, or Firm* — Reising Ethington, P.C.; Lionel D. Anderson

(57) ABSTRACT

A system and method for providing a user of a hybrid electric vehicle (HEV) more flexibility and control regarding the selection of heating modes, without adversely affecting vehicle engine emissions. According to one embodiment, when the HEV is in a normal heating mode, the user is able to switch to an economy or deferred heating mode, so long as the switch takes place during the following ignition cycle. When the HEV is in an economy heating mode the user is able to switch to a normal heating mode right away, but is only allowed to do so once per ignition cycle. In both instances, the switch between heating modes is initiated by the user through a non-emissions related system, such as a vehicle infotainment module or climate control module.

17 Claims, 4 Drawing Sheets

(56) References Cited

U.S. PATENT DOCUMENTS

| | | | | |
|---|---|---|---|---|
| 2010/0050671 A1* | 3/2010 | Kahn | ................ | B60H 1/00378 |
| | | | | 62/190 |
| 2010/0304193 A1* | 12/2010 | Karlsson | ............... | B60L 3/0046 |
| | | | | 429/50 |
| 2015/0183294 A1* | 7/2015 | Hamamoto | ............... | F25B 5/04 |
| | | | | 62/208 |
| 2016/0114653 A1* | 4/2016 | Horn | ................ | B60H 1/00735 |
| | | | | 165/202 |

* cited by examiner

SYSTEM AND METHOD FOR CONTROLLING HEATING MODES FOR HYBRID ELECTRIC VEHICLE (HEV)

FIELD

The present invention generally relates to hybrid electric vehicles (HEVs) and, more particularly, to a system and method for controlling heating modes in a HEV in a manner that gives the user more control but ensures that vehicle engine emissions are not adversely affected.

BACKGROUND

Hybrid electric vehicles (HEVs) include a number of different types of vehicle systems, including those that are related to vehicle engine emissions and those that are not. "Emissions related systems" include all modules, devices and/or other vehicle drivetrain systems that are subject to certain governmental emissions regulations, such as the On-Board Diagnostics (OBD) and (OBD II) regulations put out by the California Air Resources Board (CARB), which is a department within the California Environmental Protection Agency. Some examples of emissions related systems within a typical HEV include a vehicle integrated control module (VICM), an engine control module, and a propulsion system control module, to cite a few. Other systems, like a vehicle climate control module or a vehicle infotainment module, are not generally subject to the governmental emissions regulations identified above and are considered "non-emissions related systems."

SUMMARY

According to one embodiment, there is provided a system for controlling heating modes in a hybrid electric vehicle (HEV), comprising a first non-emissions related system, a second non-emissions related system, and an emissions related system. The first non-emissions related system is configured with a heating mode menu, the heating mode menu enables a user to select between a normal heating mode or an economy heating mode that are separated by a temperature threshold, and the first non-emissions related system sends a heating mode selection signal representative of the heating mode selection. The second non-emissions related system is configured with climate control settings, the climate control settings enable the user to select the operational state of a heating ventilation air conditioning (HVAC) unit and the second non-emissions related system sends a HVAC status signal representative of the operational state of the HVAC unit. The emissions related system is coupled to the first non-emissions related system and receives the heating mode selection signal, and the emissions related system is coupled to the second non-emissions related system and receives the HVAC status signal. When the HEV is operating in the normal heating mode and a heating mode selection signal is received that indicates selection of the economy heating mode, the emissions related system is configured to decrease the temperature threshold on or after the next time the HEV is turned off; and when the HEV is operating in the economy heating mode and a HVAC status signal is received that indicates the user has turned the HVAC unit on, the emissions related system is configured to increase the temperature threshold before the next time the HEV is turned off.

According to another aspect, there is provided a method for controlling heating modes in a hybrid electric vehicle (HEV). The method may comprise the steps of: receiving a heating mode selection signal from a non-emissions related system while the HEV is operating in a normal heating mode, the heating mode selection signal indicates that the user has selected an economy heating mode; maintaining a temperature threshold at a first threshold level, the first threshold level is associated with the normal heating mode and a second threshold level is associated with the economy heating mode; receiving an ignition signal from a vehicle ignition system, the ignition signal indicates that the user has turned the HEV off; automatically turning a heating ventilation air conditioning (HVAC) unit off at some time on or after receiving the off ignition signal; and automatically decreasing the temperature threshold at some time on or after receiving the off ignition signal, wherein the temperature threshold is decreased from the first threshold level to the second threshold level so that the HEV will operate in the economy heating mode the next time the user turns the HEV on.

According to another aspect, there is provided a method for controlling heating modes in a hybrid electric vehicle (HEV). The method may comprise the steps of: receiving a HVAC status signal from a non-emissions related system while the HEV is operating in an economy heating mode, the HVAC status signal indicates that the user has turned a heating ventilation air conditioning (HVAC) unit on; automatically increasing a temperature threshold in response to receiving the HVAC status signal, the temperature threshold is increased from a second threshold level associated with the economy heating mode to a first threshold level associated with a normal heating mode; receiving an ignition signal from a vehicle ignition system, the ignition signal indicates that the user has turned the HEV off; and automatically decreasing the temperature threshold at some time on or after receiving the off ignition signal, wherein the temperature threshold is decreased from the first threshold level to the second threshold level so that the HEV will operate in the economy heating mode the next time the user turns the HEV on.

DRAWINGS

Preferred exemplary embodiments will hereinafter be described in conjunction with the appended drawings, wherein like designations denote like elements, and wherein.

Figure 3A:
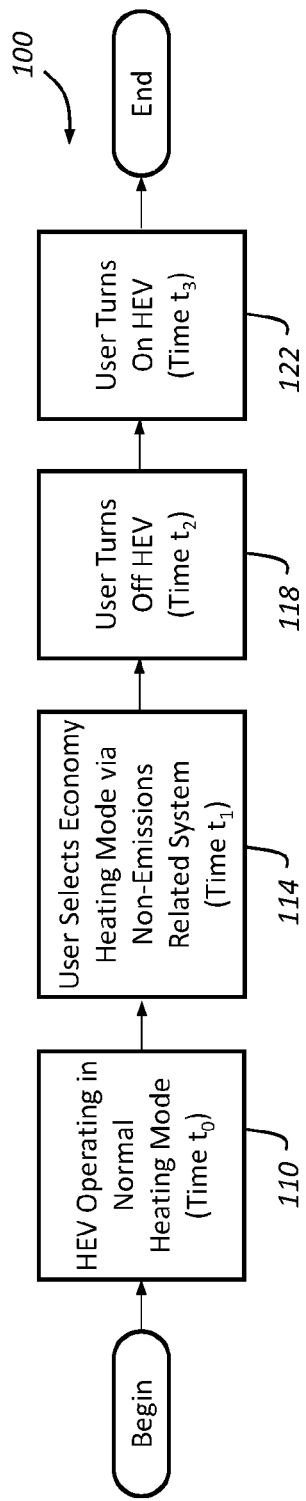
Figure 3B:
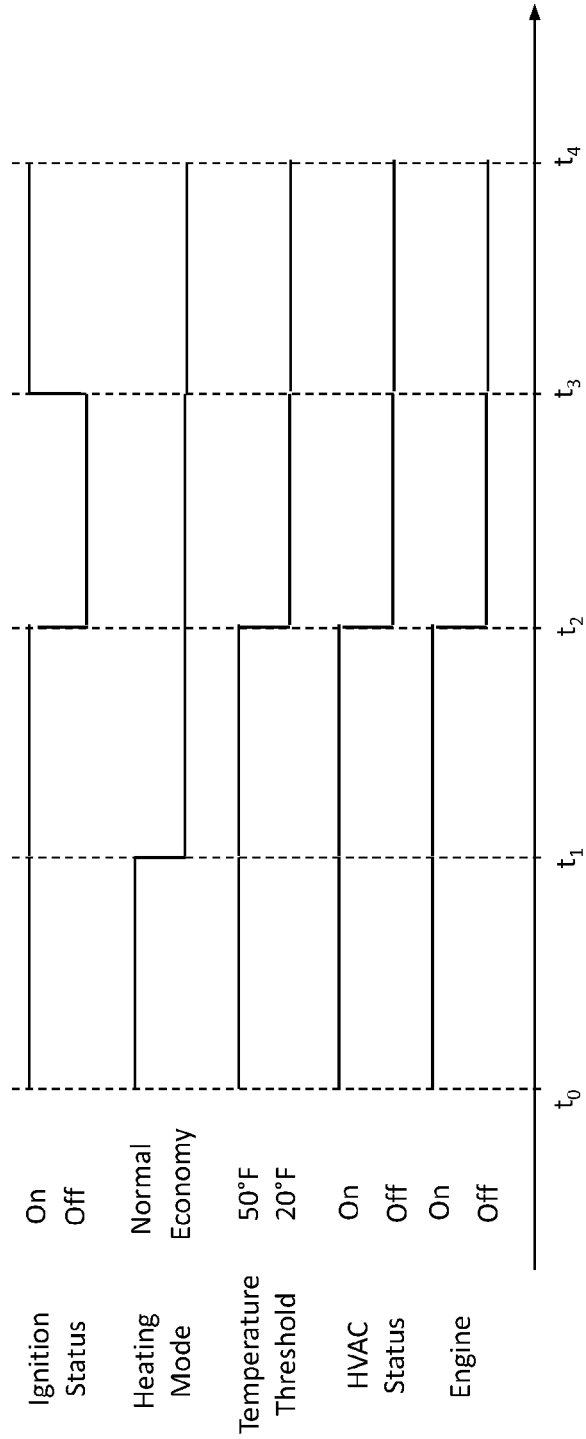
Figure 4A:
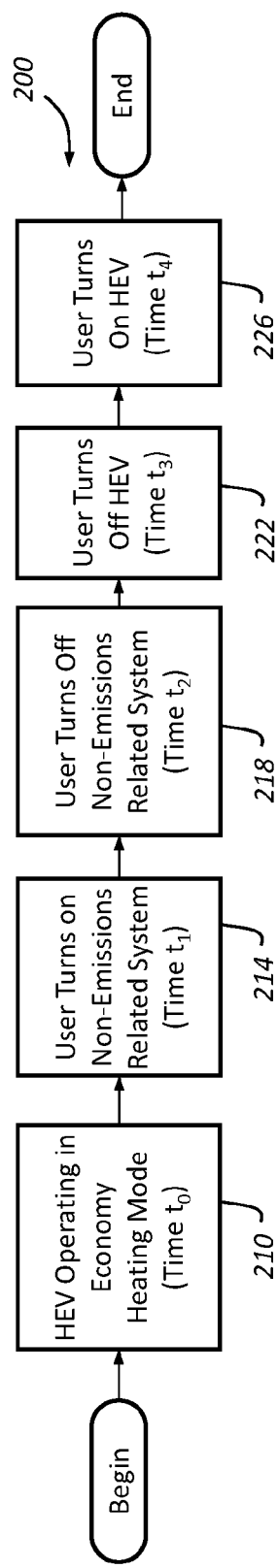
Figure 4B:
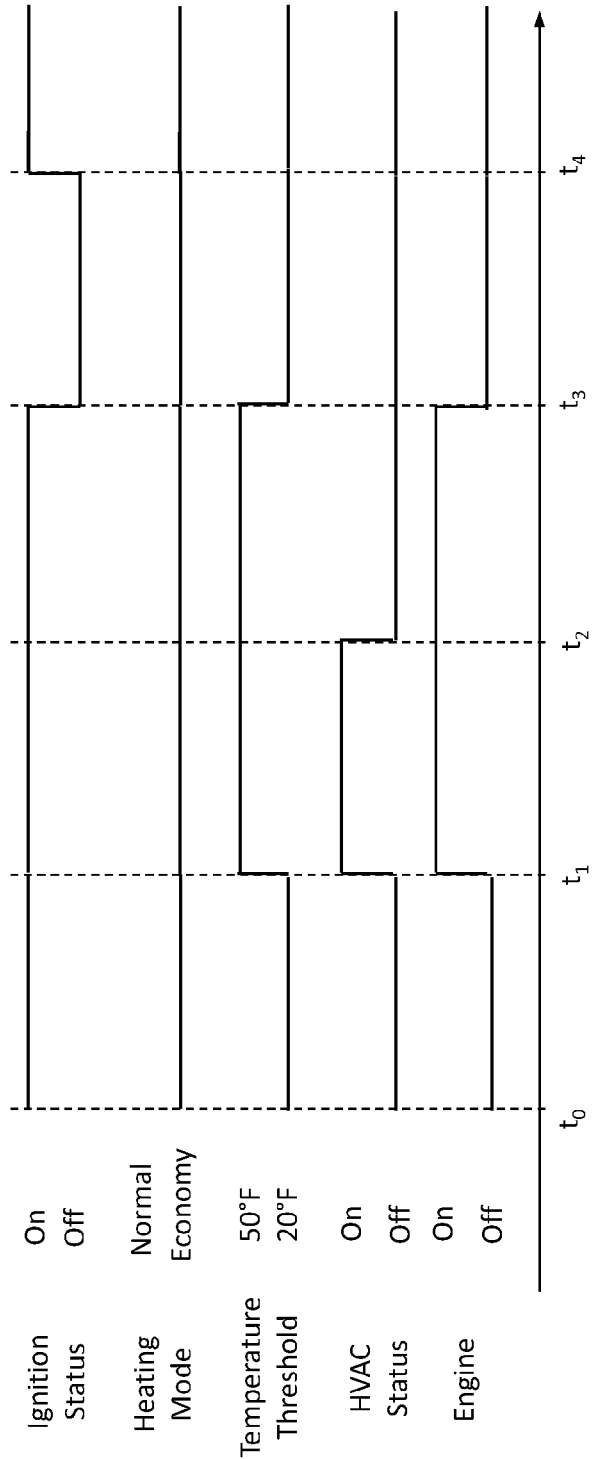

FIG. 3A is a flowchart and FIG. 3B is a corresponding timing diagram for an exemplary method that can be performed when the HEV is operating in a normal heating mode and a user selects an economy heating mode via a heating mode menu; and FIG. 4A is a flowchart and FIG. 4B is a corresponding timing diagram for an exemplary method that can be performed when the HEV is operating in an economy heating mode and a user turns on an HVAC unit.

DESCRIPTION

The system and method described herein are designed to give the user of a hybrid electric vehicle (HEV) more flexibility and control regarding the selection of heating modes, but to do so in a way that does not adversely affect vehicle engine emissions. According to one exemplary embodiment, when the HEV is in a normal heating mode, the user is able to switch to an economy or deferred heating mode, so long as the switch takes place during the following ignition cycle; and when the HEV is in an economy heating mode the user is able to switch to a normal heating mode right away, but is only allowed to do so once per ignition cycle. In both of the preceding instances, the switch or transition between heating modes is initiated by the user through a non-emissions related system, such as a vehicle infotainment module or climate control module.

Figure 1:
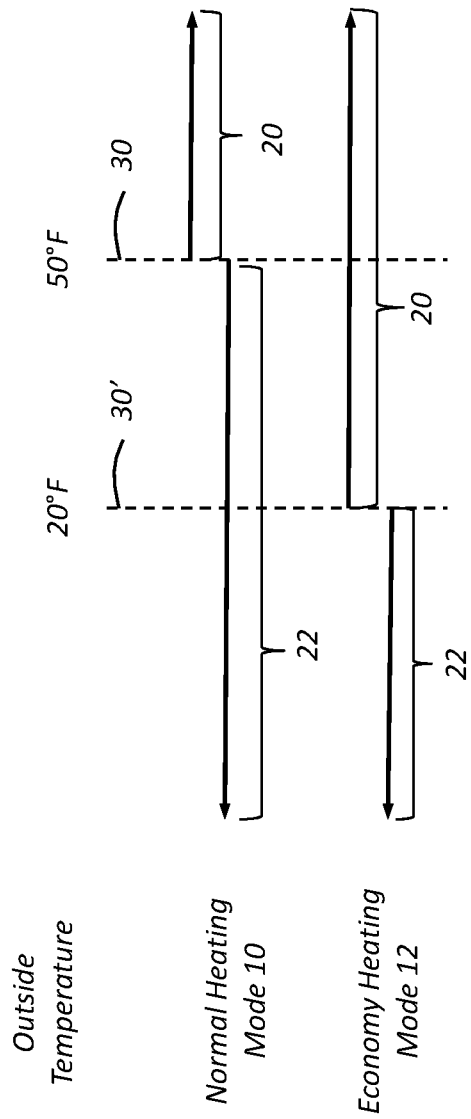
FIG. 1 is a schematic illustration of a normal heating mode and an economy heating mode for use with an exemplary hybrid electric vehicle (HEV)

With reference to FIG. 1, there is shown a schematic illustration of two different heating modes. A normal heating mode 10 is shown with a temperature threshold 30 set at a first threshold level (e.g., 50° F.). When the HEV is operating in the normal heating mode 10 and the outside temperature is above the first threshold level of 50° F., the HEV may provide heat with one or more electric heaters (segment 20) or it may provide no heat at all; and when the HEV is in the normal heating mode and the outside temperature is below the first threshold level of 50° F., the HEV provides heat with an internal combustion engine alone or in combination with electric heaters (segment 22). To explain, HEVs may include a feature that uses engine coolant heat to condition the cabin when the HVAC system requests heat. In order to not adversely affect vehicle engine emissions, the engine is forced on below a certain outside temperature threshold (temperature threshold 30, 30') and not allowed to run above that temperature threshold. When the engine is used to provide heat in this manner, it is referred to as Engine Assisted Heating (EAH) and the temperature thresholds are sometimes referred to as EAH Temperature Thresholds or EAH Thresholds. These thresholds are simply referred to herein as "temperature thresholds."

In the past, a temperature threshold was oftentimes static, which did not provide the user with much control over the heating mode, as it was automatically determined based on whether or not the outside temperature was above or below the static threshold. In other instances, a user may have been able to change a temperature threshold, but not when the vehicle was being driven. This could present an issue, for example, if the vehicle was in an economy mode using electrical heaters or no heaters at all and the driver determined that more heat was needed, as they may have to wait until the next ignition cycle before transitioning to a normal heating mode and turning on the engine. It should be appreciated that an internal combustion engine is typically a more expedient and effective source of heat in cold environments than electric heaters, but an engine uses more fuel and therefore can negatively impact the fuel economy of the HEV.

There are many HEV users who would like more control over the heating mode and, thus, more control over fuel economy. The present system and method provides HEV users with the ability to modify or change a temperature threshold, under certain conditions, which in turn affects whether the vehicle is heated with an internal combustion engine or electric heaters. If the outside temperature is greater than a first threshold level 30 (e.g., greater than 50° F.), the method assumes that it is rather warm outside and the vehicle may be automatically heated with one or more electric heaters when heat is requested. Conversely, if the outside temperature is less than a second threshold level 30' (e.g., less than 20° F.), the method assumes that it is quite cold outside and an internal combustion engine is turned on in order to supply the vehicle with heat. But when the outside temperature is in between the first and second threshold levels 30 and 30' (e.g., between 20° F. and 50° F.), the method considers this a somewhat moderate temperature range and provides the user with the ability to determine which heating mode is employed: a normal heating mode 10 or an economy heating mode 12. This, in turn, gives the user some degree of control over whether or not the internal combustion engine is turned on, which of course can impact fuel economy.

If the user has selected the normal heating mode 10, then the temperature threshold is set at the first threshold level 30; if the user has selected the economy heating mode 12, then the temperature threshold is set at the second threshold level 30', which is lower than the first threshold level. Put differently, the economy heating mode 12 is a selectable mode or setting that allows the user to lower the threshold level from 30 to 30' during certain circumstances and, in effect, prevents the internal combustion engine from turning on for purposes of heating when the outside temperature is between temperature thresholds 30' and 30. A user who selects the economy heating mode 12 typically does so for purposes of improved fuel economy, as the engine consumes fuel when it provides heat to the vehicle. Current systems do not enable a user to keep the internal combustion engine off when additional heat is not required, yet allow them to turn the engine on when additional heat is desired. The present system and method provides such a feature.

Since the economy heating mode 12 can affect the operation of an internal combustion engine, selection of this mode is typically governed by an emissions related system that is subject to all of the requirements and regulations thereof. The system and method described herein provide the user more flexibility in terms of being able to select an economy heating mode 12, under certain circumstances, but do so in a manner that is carried out by a non-emissions related system. It should be appreciated that all of the exemplary values, parameters, settings, temperatures, etc. provided herein (e.g., 20° F. and 50° F. for temperature thresholds 30' and 30) are simply provided for purposes of illustration, as the present method and system are not limited to such values. It should be appreciated that the normal and economy heating modes discussed herein may be used with any number of different HVAC settings, such as defrost, recirculation, fan only, etc. Moreover, the normal and economy heating modes are designed for use in heating the vehicle cabin and are not necessarily designed for air conditioning the vehicle cabin.

Figure 2:
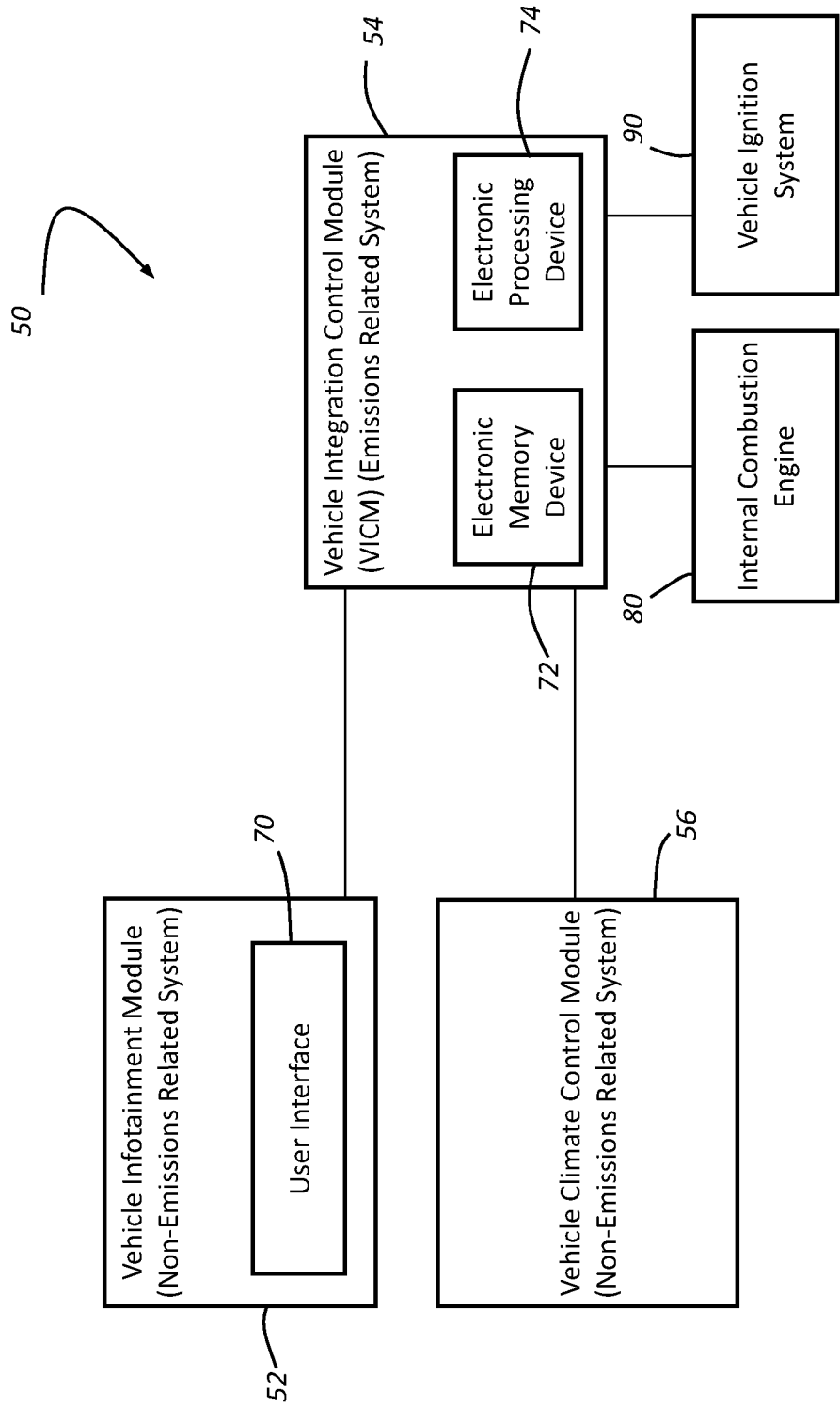
FIG. 2 is a block diagram of an exemplary system for controlling heating modes in a HEV, such as the heating modes of FIG. 1.

The present method and system may be used with any suitable hybrid electric vehicle (HEV), including plug-in hybrid electric vehicles (PHEVs), extended range electric vehicles (EREVs), series hybrid vehicles, parallel hybrid vehicles, or any other vehicle having an internal combustion engine that may be turned on and off during vehicle operation. Turning now to FIG. 2, there is shown a block diagram of an exemplary system 50 for controlling heating modes in a hybrid electric vehicle (HEV). According to this particular example, the system 50 includes a vehicle infotainment module 52, a vehicle integrated control module (VICM) 54, and a vehicle climate control module 56. Skilled artisans will appreciate that the particular combination of vehicle devices, modules and/or systems may vary from the exemplary combination shown here, as the system 50 is not limited to this particular embodiment.

Vehicle infotainment module 52 is a "non-emissions related system," as defined above, and it may include any combination of hardware, software and/or other components needed to provide passengers with various types of entertainment, communications and/or other information. For instance, vehicle infotainment module 52 may include audio, visual and/or audio/visual equipment (e.g., CD players, DVD players, display screens, etc.), navigation systems, camera systems (e.g., display screen for a backup camera), video game consoles, as well as other types of user interfaces. According to one example, the vehicle infotainment module 52 includes a user interface 70 that is configured with a heating mode menu so that a user can select or change the heating mode of the HEV and then send a heating mode selection signal to the VICM 54. The user interface 70 may include various components including, for example, input components like a touch-screen display, a microphone, a keyboard, a pushbutton or other control where it receives information from a user, as well as output components like a visual display, an instrument panel, or an audio system where it provides information to the user. Of course, the user interface 70 may audibly present information to and/or receive information from the user through the use of voice-recognition and/or other human-machine interface (HMI) technology. The vehicle infotainment module 52 and user interface 70, which is programmed with a heating mode menu, may be a stand alone module or system or they may be part of some other module, device and/or system in the vehicle.

Vehicle integrated control module (VICM) 54 is an "emissions related system," as defined above, and it may include any combination of hardware, software and/or other components needed to perform various control and/or communication related functions within the HEV. In an exemplary embodiment, control module 54 includes an electronic memory device 72 and an electronic processing device 74. Memory device 72 may include any type of suitable electronic memory means and may store a variety of data and information. This includes, for example, sensed or measured outside temperatures, look-up tables and other data structures, algorithms, temperature thresholds, etc. The method described below—as well as any combination of information needed to perform such method—may be stored or otherwise maintained in memory device 72. Processing device 74 may include any type of suitable electronic processor (e.g., a microprocessor, a microcontroller, an application specific integrated circuit (ASIC), etc.) that executes instructions for software, firmware, programs, algorithms, scripts, etc. Control module 54 may be electronically connected to other vehicle devices and modules, such as vehicle infotainment module 52 and vehicle climate control module 56, and it can interact with them as required. Control module 54 may be a stand alone module or system or it may be part of some other module, device and/or system in the vehicle (e.g., a propulsion control module, a power train control module, a hybrid control module, an engine control module, a battery management system (BMS), a vehicle energy management system, etc.). Many different types and arrangements for control module 54 may be used with the method described below, as the present method is not limited to any one embodiment.

Vehicle climate control module 56 is a "non-emissions related system," as defined above, and it may include any combination of hardware, software and/or other components needed to control the climate in and around the HEV. For example, the vehicle climate control module 56 may include or communicate with user-activated climate controls, such as those that are on the vehicle instrument cluster or are part of a climate control menu, in order to control the cabin environment as well as other aspects of the vehicle. In an exemplary embodiment, the vehicle climate control module 56 receives inputs, commands, signals, etc. from user-activated climate controls and then controls a heating ventilation and air conditioning (HVAC) unit accordingly. It is also possible for the vehicle climate control module 56 to control other components, devices, systems, etc. in the vehicle that have a thermal functionality, such as heated/cooled seats, a heated steering wheel, etc. According to one example, the vehicle climate control module 56 uses heat from one or more electric heaters and/or an internal combustion engine to provide cabin heat with the HVAC unit, and sends an HVAC status signal to the VICM 54 that is representative of the operational state of the HVAC unit.

System 50 is not limited to the exemplary combination and arrangement generally illustrated in FIG. 2, as that block diagram is simply provided to give an example of one such combination. Other of components, devices and/or modules may be used in addition to or in lieu of those shown there. For example, an internal combustion engine 80 and a vehicle ignition system 90 may also be included, where the engine is designed to help provide energy for the HEV battery and/or assist with vehicle propulsion (depending on the type of hybrid), and the vehicle ignition system may include an ignition switch (keyed or keyless), as well as other components, and provides the system with an ignition signal that indicates the operational status of the vehicle ignition (e.g., whether the vehicle is turned on or off). Both the engine 80 and the vehicle ignition system 90 may be connected, directly or indirectly, to control module 54. In another example, the control module 54 communicates and/or otherwise interacts with a vehicle propulsion control module or the like in order to turn the engine on or off. Other embodiments are certainly possible.

Turning now to FIGS. 3A-4B there are shown several flowcharts and corresponding timing diagrams that illustrate different scenarios and implementations of the present method. Starting with FIGS. 3A and 3B, there is described a first embodiment of method 100 where an HEV is operating in a normal heating mode 10 when a user selects an economy or deferred heating mode 12. According to this embodiment, the HEV transitions from the normal heating mode 10 to the economy heating mode 12 on the next ignition cycle, which has the effect of changing the temperature threshold from a first threshold level 30 (e.g., 50° F.) to a second threshold level 30' (e.g., 20° F.). If at any time during method 100 the outside temperature falls below temperature threshold level 30', the HEV will automatically turn on the internal combustion engine 80, if it was not turned on already, and provide heat from the engine. Conversely, if at any time the outside temperature is above temperature threshold level 30, the HEV may use electric heaters to provide heat requested by the user. As for the temperature range between thresholds 30' and 30, the source of heat is dictated by which heating mode 10 or 12 the HEV is in. It is assumed in the following description that the outside temperature is between temperature thresholds 30' and 30 (e.g., between 20° F. and 50° F.).

Beginning with step 110, the HEV starts out operating in a normal heating mode 10. As explained above, in a normal heating mode the temperature threshold is set to a higher threshold value 30 (e.g., 50° F.) so that one or more electric heaters may be used to heat the vehicle cabin when the outside temperature is above temperature threshold 30, and internal combustion engine 80 heats the vehicle cabin when the outside temperature is below the temperature threshold 30. In the timing diagram of FIG. 3B, step 110 generally corresponds to time $t_0$, at which point: the ignition status is on (i.e., the user has turned on the vehicle), the heating mode is set to normal, the temperature threshold is set to the higher threshold value 30 (e.g., 50° F.), and the HVAC status is on (i.e., the user is requesting cabin heat). Because the current outside temperature is less than the temperature threshold, the engine 80 is on and is being used to heat the vehicle cabin.

At step 114, the user selects an economy or deferred heating mode 12, which has the effect of lowering the temperature threshold from threshold level 30 to 30' on the next ignition cycle. There are a variety of potential ways in which the user may make this selection or change to the heating mode. According to one example, the user selects the economy heating mode 12 through some type of heating mode menu that is maintained at vehicle infotainment module 52 and is presented through user interface 70, however, other non-emissions related systems may be used instead. There may be certain restrictions on the use of the heating mode menu (e.g., it can only be engaged when the vehicle is parked and not being driven). As mentioned above, full implementation of the economy heating mode 12 does not take effect until the next ignition cycle. Step 114 corresponds to time $t_1$ in the timing diagram of FIG. 3B, at which point: the ignition status is still on, the heating mode has been changed to economy, the temperature threshold remains at threshold value 30 (e.g., 50° F.), and the HVAC status is still on. In this set of circumstances, the outside temperature is still below the current temperature threshold 30 of 50° F., thus, the engine 80 remains on to provide heat to the vehicle cabin. It is worth noting that even though the heating mode setting was changed from normal to economy, the temperature threshold does not change until sometime at or after the next time the vehicle is turned off (e.g., a brief housekeeping period following a key off event).

Next, the user turns off the HEV at step 118 (i.e., an ignition or key-off event). In addition to other housekeeping type tasks that may accompany an ignition event, step 118 decreases the temperature threshold from threshold value 30 to 30' (e.g., reduces it from 50° F. to 20° F.) and automatically sets the HVAC status to off, in the event that the user did not do so before turning the vehicle off. According to an exemplary embodiment, the VICM 54 receives an ignition signal from vehicle ignition system 90 indicating that the vehicle has been turned off. Although the changes to the temperature threshold and the HVAC status are schematically shown in the timing diagram of FIG. 3B as occurring at the moment the HEV is turned off, it should be appreciated that these changes may be made or may take affect at any suitable time following reception of the ignition signal from vehicle ignition system 90 indicating that the HEV has been turned off (e.g., at any time between $t_2$ and $t_4$, inclusive). Step 118 generally corresponds to time $t_2$, at which point: the ignition status has been changed to off, the heating mode continues to be set at economy, the temperature threshold is automatically decreased from threshold level 30 to threshold level 30' (e.g., from 50° F. to 20° F.), and the HVAC status automatically changes to off. This set of circumstances, namely the driver turning the HEV off, results in the engine being off.

In step 122, the user turns the HEV on with an ignition event and begins operating the vehicle. Assuming that the outside temperature is still between thresholds 30' and 30 and that no other relevant parameters or settings have changed, the method will now operate according to the economy heating mode 12. Because the temperature threshold, which is a variable or non-static threshold, has been lowered from level 30 to level 30', the outside temperature is no longer below the temperature threshold; thus, the internal combustion engine 80 is off. This is reflected in the timing diagram around time $t_3$, at which point: the ignition status has switched to on, the heating mode remains set at economy since the user has not changed this setting, the temperature threshold is set to the lower threshold level 30' (e.g., 20° F.), and the HVAC status is still off. The vehicle is operating in the fuel-conserving, user-selected economy heating mode 12, also referred to as a deferred heating mode. This set of circumstances results in the engine being off.

From step 122 onwards, the HEV will remain in the economy heating mode 12 until the user makes changes to the settings. As mentioned above, one way for the user to change the heating mode is through personalization or customization features in the heating mode menu or some other interface provided by a non-emissions related system, like the vehicle infotainment module 52 or the vehicle climate control module 56. Another way for the user to change the heating mode, at least temporarily, is to turn on the HVAC unit while the HEV is operating in the economy heating mode. This scenario is described next.

Turning now to FIGS. 4A and 4B, there is described a method 200 where an HEV starts out operating in the economy heating mode 12, but during operation of the vehicle the driver decides that he or she requires more heat and turns the HVAC unit on. In this scenario, the method allows for a one time increase in the temperature threshold from threshold level 30' to threshold level 30 (e.g., from 20° F. to 50° F.) during the current ignition cycle, instead of waiting to the following ignition cycle. One potential explanation for allowing this change to occur immediately or almost immediately, as opposed to waiting until the following ignition cycle, is that a request for heat or defogging is generally deemed more time sensitive than a request for a more fuel efficient heating mode. If at any time during method 200 the outside temperature falls below temperature threshold 30', the HEV will automatically turn on the engine 80 as a heat source, if it was not already turned on. If at any time the outside temperature is above temperature threshold 30, the HEV may automatically use the electric heaters for heating the vehicle cabin. It should be appreciated that if the HEV is being driven while the outside temperature goes above temperature threshold 30, the engine will not necessarily turn off. If, however, the HEV is started when the outside temperature is already above the temperature threshold 30, then the engine will not be started. It is again assumed in the following description of method 200 that the outside temperature is between temperature threshold levels 30' and 30 (e.g., 20° F. and 50° F.).

Starting with step 210, the HEV begins operating in the economy heating mode 12. At this point, which corresponds with time $t_0$ in the timing diagram of FIG. 4B: the ignition status is on, the heating mode is set to economy, the temperature threshold is set to the lower threshold value 30' that corresponds with the economy heating mode (e.g., 20° F.), and the HVAC status is off which was the status when the vehicle was last turned off. This set of circumstances results in the engine being off.

At step 214, the driver determines that more heat is needed, possibly to defrost the windshield or for some other vehicle cabin heating purpose, so they turn on the HVAC unit. According to this embodiment, turning on the HVAC unit will change the temperature threshold, which in turn results in the internal combustion engine 80 being turned on for enhanced or assisted heating, but will not change the heating mode. This user selection is treated as a one-time selection that cannot be reversed during the current ignition cycle. By providing the user with a one-time opportunity to temporarily manipulate the temperature threshold level while driving, the method provides the user with greater flexibility and control of the heating mode without adversely affecting vehicle engine emissions. Once the user has turned the HVAC unit on and the temperature threshold has been increased accordingly, the user is prevented from further temperature threshold modification until the following ignition cycle. This step generally corresponds to time $t_1$ in the timing diagram of FIG. 4B, at which point: the ignition status remains on, the heating mode remains in economy even though the user has turned the HVAC on, the temperature threshold level has been temporarily increased from 30' to 30 (e.g., from 20° F. to 50° F.), and the HVAC status has been changed to on. This set of circumstances results in the engine being turned on.

After some period of time, the user determines that the additional heat provided by the engine is no longer needed and turns the HVAC unit off, step 218. Method 200 only allows the user to change the temperature threshold level once per ignition cycle. In one embodiment, this restriction is reset the next time the vehicle is turned off (i.e., the following ignition event); in a different embodiment, this restriction is reset the next time the driver puts the vehicle in park and then subsequently resumes driving the vehicle. Other triggers, such as the next ignition event, may be used instead to reset the "once-per-cycle" restriction or limitation on changing the temperature threshold. Accordingly, even though the user has turned off the HVAC unit in step 218 and essentially requested that the HEV transition back to the economy heating mode, the vehicle will be prevented from doing so until the next cycle. This is reflected in the timing diagram of FIG. 4B at time $t_2$, at which point: the ignition status remains on, the heating mode remains set at economy, the temperature threshold remains at the elevated threshold level 30 (e.g., 50° F.), and the HVAC status has been changed to off. Because the temperature threshold is set to the higher threshold level 30 (e.g., 50° F.), the engine remains on.

If the user turns off the HEV at step 222, which corresponds to time $t_3$, then the ignition status will change to off, the heating mode remains in economy, the temperature threshold decreases to the lower threshold level 30' (e.g., 20° F.) since the temporary period for increasing the threshold has expired, and the HVAC status remains off. This set of circumstances, particularly that the HEV has been turned off, results in the engine being off. It should be noted that had the user not turned off the HVAC unit before turning off the vehicle, method 200 could have automatically turned off the HVAC unit because the HEV was in economy heating mode in a manner similar to that performed in step 118.

Assuming that the user has not gone into the heating mode menu and changed the heating mode, when the HEV is turned on again at step 226 the vehicle will once again be operating in the economy heating mode 12. This is reflected at time $t_4$, at which point: the ignition status will again be on, the heating mode remains in economy, the temperature threshold stays at the lower threshold level 30' (e.g., 20° F.), and the HVAC status remains off. This set of circumstances results in the engine being off, as reflected in the timing diagram. At this point, the method may simply proceed from step 210 or some other suitable starting point. If, for example, the user had selected the normal heating mode when the HEV was off between time $t_3$ and $t_4$, then the method may proceed from step 110 or some other suitable starting point.

Again, the sequence of events illustrated in FIGS. 4A-4B is designed to illustrate the feature where a user is allowed to use a non-emissions related system to change the temperature threshold once per ignition or drive cycle, and hence turn on an engine for enhanced or assisted heating once per key cycle.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for controlling heating modes in a hybrid electric vehicle (HEV), comprising:
    a first non-emissions related system being configured with a heating mode menu, the heating mode menu enables a user to select between a normal heating mode or an economy heating mode that are separated by a temperature threshold, and the first non-emissions related system sends a heating mode selection signal representative of the heating mode selection;
    a second non-emissions related system being configured with climate control settings, the climate control settings enable the user to select the operational state of a heating ventilation air conditioning (HVAC) unit and the second non-emissions related system sends a HVAC status signal representative of the operational state of the HVAC unit;
    an emissions related system being coupled to the first non-emissions related system for receiving the heating mode selection signal, and the emissions related system being coupled to the second non-emissions related system for receiving the HVAC status signal;
    when the HEV is operating in the normal heating mode and a heating mode selection signal is received that indicates selection of the economy heating mode, the emissions related system is configured to decrease the temperature threshold on or after the next time the HEV is turned off; and when the HEV is operating in the economy heating mode and a HVAC status signal is received that indicates the user has turned the HVAC unit on, the emissions related system is configured to increase the temperature threshold before the next time the HEV is turned off.

2. The system of claim 1, wherein the first non-emissions related system includes a vehicle infotainment system, the vehicle infotainment system is configured with the heating mode menu which is presented to the user via a user interface.

3. The system of claim 1, wherein the emissions related system includes a vehicle integrated control module (VICM).

4. The system of claim 1, wherein the second non-emissions related system includes a vehicle climate control module.

5. A method for controlling heating modes in a hybrid electric vehicle (HEV), the method comprising the steps of:
receiving a heating mode selection signal from a non-emissions related system while the HEV is operating in a normal heating mode, the heating mode selection signal indicates that the user has selected an economy heating mode;
maintaining a temperature threshold at a first threshold level, the first threshold level is associated with the normal heating mode and a second threshold level is associated with the economy heating mode;
receiving an ignition signal from a vehicle ignition system, the ignition signal indicates that the user has turned the HEV off;
automatically turning a heating ventilation air conditioning (HVAC) unit off at a same time of or at a later time after receiving the off ignition signal; and
automatically decreasing the temperature threshold at a same time of or at a later time after receiving the off ignition signal, wherein the temperature threshold is decreased from the first threshold level to the second threshold level so that the HEV will operate in the economy heating mode the next time the user turns the HEV on.

6. The method of claim 5, wherein in both the normal heating mode and the economy heating mode one or more electrical heaters are used to provide heat when the outside temperature is above the temperature threshold and an internal combustion engine is used to provide heat when the outside temperature is below the temperature threshold.

7. The method of claim 5, wherein the step of receiving a heating mode selection signal further comprises receiving the heating mode selection signal from a vehicle infotainment module, and the vehicle infotainment system is configured with a heating mode menu which is presented to the user via a user interface.

8. The method of claim 5, wherein the step of maintaining a temperature threshold further comprises maintaining the temperature threshold at the first threshold level, even though the first threshold level is associated with the normal heating mode and the user has selected the economy heating mode.

9. The method of claim 5, wherein the step of automatically turning a heating ventilation air conditioning (HVAC) unit off further comprises automatically turning the HVAC unit off so that the HVAC unit will remain off the next time the user turns the HEV on.

10. The method of claim 5, wherein the step of automatically decreasing the temperature threshold further comprises decreasing the temperature threshold from the first threshold level of approximately 50° F. to the second threshold level of approximately 20° F.

11. A method for controlling heating modes in a hybrid electric vehicle (HEV), the method comprising the steps of:
receiving a HVAC status signal from a non-emissions related system while the HEV is operating in an economy heating mode, the HVAC status signal indicates that the user has turned a heating ventilation air conditioning (HVAC) unit on;
automatically increasing a temperature threshold in response to receiving the HVAC status signal, the temperature threshold is increased from a second threshold level associated with the economy heating mode to a first threshold level associated with a normal heating mode;
receiving an ignition signal from a vehicle ignition system, the ignition signal indicates that the user has turned the HEV off; and
automatically decreasing the temperature threshold at a same time of or at a later time after receiving the off ignition signal, wherein the temperature threshold is decreased from the first threshold level to the second threshold level so that the HEV will operate in the economy heating mode the next time the user turns the HEV on.

12. The method of claim 11, wherein in both the normal heating mode and the economy heating mode one or more electrical heaters are used to provide heat when the outside temperature is above the temperature threshold and an internal combustion engine is used to provide heat when the outside temperature is below the temperature threshold.

13. The method of claim 11, wherein the step of receiving a HVAC status signal further comprises receiving the HVAC status signal from a vehicle climate control module.

14. The method of claim 11, wherein the step of automatically increasing a temperature threshold further comprises maintaining the HEV in the economy heating mode even though the temperature threshold has been temporarily increased to the first threshold level which is associated with the normal heating mode.

15. The method of claim 11, wherein the step of automatically increasing a temperature threshold further comprises preventing further temperature threshold changes while the HEV is operating in a current ignition cycle so that the automatic increase of the temperature threshold is a temporary one-time change.

16. The method of claim 11, wherein the step of automatically increasing a temperature threshold further comprises maintaining the temperature threshold at the first threshold level associated with the normal heating mode for the remainder of a current ignition cycle even if the user turns the HVAC unit off.

17. The method of claim 11, wherein the step of automatically increasing the temperature threshold further comprises increasing the temperature threshold from the second threshold level of approximately 20° F. to the first threshold level of approximately 50° F.

* * * * *